(12) United States Patent
Arvind et al.

(10) Patent No.: US 9,565,163 B1
(45) Date of Patent: Feb. 7, 2017

(54) VERIFICATION OF NETWORK SERVICE PATHS

(71) Applicant: Overture Networks, Inc., Morrisville, NC (US)

(72) Inventors: Krishnamoorthy Arvind, Acton, MA (US); Ramesh Nagarajan, Brentwood, NH (US); Richard Tang-Kong, Chelmsford, MA (US)

(73) Assignee: ADVA OPTICAL NETWORKING SE, Meiningen-Dreiβigacker (DE)

( * ) Notice: Subject to any disclaimer, the term of this patent is extended or adjusted under 35 U.S.C. 154(b) by 45 days.

(21) Appl. No.: 14/728,278

(22) Filed: Jun. 2, 2015

Related U.S. Application Data

(60) Provisional application No. 62/026,664, filed on Jul. 20, 2014.

(51) Int. Cl.
*H04L 12/26* (2006.01)
*H04L 29/06* (2006.01)

(52) U.S. Cl.
CPC ........... *H04L 63/0245* (2013.01); *H04L 43/10* (2013.01)

(58) Field of Classification Search
CPC .............................. H04L 63/0245; H04L 43/10
USPC ............................................................ 726/13
See application file for complete search history.

(56) References Cited

U.S. PATENT DOCUMENTS

| | | | |
|---|---|---|---|
| 2009/0113045 A1* | 4/2009 | Kozisek | 709/224 |
| 2014/0029441 A1* | 1/2014 | Nydell | 370/241.1 |
| 2014/0280807 A1* | 9/2014 | Bencheck et al. | 709/222 |

* cited by examiner

*Primary Examiner* — Ellen Tran
(74) *Attorney, Agent, or Firm* — Kevin E Flynn; Flynn IP Law

(57) ABSTRACT

Verification of continuity for a network service path that includes at least one network function that blocks test packets may be achieved by providing a bypass mechanism to bypass test packets around the at least one network function that blocks test packets. Verification of continuity may be done when the network service is available for active use or when it is not ready for active use. Detection of a continuity problem leads to more detailed diagnostic work.

23 Claims, 34 Drawing Sheets

FIG. 11
Prior Art
500

| 504 | 508 | 510 | 512 | 516 | 520 |

FIG. 12
Prior Art
550

| 504 | 508 | 510 | 512 | 554 | 558 |

FIG. 13

| FIG. 13A |
|----------|
| FIG. 13B |
| FIG. 13C |

Set up a bypass between the interfaces tap1 and tap2 of a VM, which are attached (each on a different VLAN) to bridge br-int.

##########################################################

#######

<u>(i) Establish bypass bridge br-bypass</u> ovs-vsctl add-br br-bypass ovs-vsctl del-flows br-bypass ovs-ofctl add-flow br-bypass "priority=1 actions=drop"

<u>(ii) Divert traffic that would normally go through</u>

<u>tap1/tap2 to shorting bridge</u>

```
# Create "cable" used to divert traffic for tap1 to bypass
bridge
ip link add tap1bp0 type veth peer name tap1bp1
ifconfig tap1bp0 up
ifconfig tap1bp1 up

# Connect the cable to divert tap1 traffic to bypass bridge
ovs-vsctl add-port br-int tap1bp0
ovs-vsctl set port tap1bp0 trunks=$VLAN_TAP1
ovs-vsctl add-port br-bypass tap1bp1 -- set interface tap1bp1
ofport_request=1
BYPASS_OFPORT_TAP1=`ovs-vsctl list interface | grep -C1
tap1bp1 | grep ofport | awk '{print $3}'`

# Create "cable" used to divert traffic for tap2 to bypass
bridge
ip link add tap2bp0 type veth peer name tap2bp1
ifconfig tap2bp0 up
ifconfig tap2bp1 up
```

Connect the cable to divert tap2 traffic to bypass bridge ovs-vsctl add-port br-int tap2bp0 ovs-vsctl set port tap2bp0 trunks=$VLAN_TAP2 ovs-vsctl add-port br-bypass tap2bp1 -- set interface tap2bp1 ofport_request=2

BYPASS_OFPORT_TAP2=`ovs-vsctl list interface | grep -C1 tap2bp1 | grep ofport | awk '{print $3}'`

(iii) Add flows on bypass bridge to "short" $VLAN_TAP1 and $VLAN_TAP2 ovs-ofctl add-flow br-bypass

"dl_src=$SRC_MAC_ADDR,dl_dst=01:80:c2:00:00:32,in_port=$BYPAS

S_OFPORT_TAP1,dl_vlan=$VLAN_TAP1 actions=mod_vlan_vid:$VLAN_TAP2,output:$BYPASS_OFPORT_TAP2"

ovs-ofctl add-flow br-bypass

"dl_src=$SRC_MAC_ADDR,dl_dst=01:80:c2:00:00:32,in_port=$BYPAS

S_OFPORT_TAP2,dl_vlan=$VLAN_TAP2 actions=mod_vlan_vid:$VLAN_TAP1,output:$BYPASS_OFPORT_TAP1"
```

FIG. 17 ovs-ofctl add-flow br-int "in_port=$BRINT_OFPORT_INGRESS, dl_vlan=$VLAN_TAP1, dl_dst=01:80:c2:00:00:32 actions=output:tap1bp0 ovs-ofctl add-flow br-int "in_port=$BRINT_OFPORT_INGRESS, dl_vlan=$VLAN_TAP2, dl_dst=01:80:c2:00:00:32 actions=output:tap2bp0

FIG. 18.

ovs-ofctl add-flow br-int "in_port=$BRINT_OFPORT_INGRESS,
dl_vlan=$VLAN_TAP1, dl_src=$CPE_SWITCH_MAC actions=output:tap1bp0 ovs-ofctl add-flow br-int "in_port=$BRINT_OFPORT_INGRESS,
dl_vlan=$VLAN_TAP2, dl_src=$CPE_SWITCH_MAC actions=output:tap2bp0

FIG. 19

```
ovs-ofctl add-flow br-int "in_port=$BRINT_OFPORT_INGRESS, dl_vlan=$VLAN_TAP1, dl_type=$PATH_VERIFY_PROTO actions=output:tap1bp0 ovs-ofctl add-flow br-int "in_port=$BRINT_OFPORT_INGRESS, dl_vlan=$VLAN_TAP2, dl_src=$PATH_VERIFY_PROTO actions=output:tap2bp0
```

FIG. 20

```
ovs-ofctl add-flow br-int "in_port=$BRINT_OFPORT_INGRESS, dl_vlan=$OAM_VLAN actions=output:tap1bp0 ovs-ofctl add-flow br-int "in_port=$BRINT_OFPORT_INGRESS, dl_vlan=$OAM_VLAN actions=output:tap2bp0
```

FIG. 21 ovs-ofctl add-flow br-int "in_port=$BRINT_OFPORT_INGRESS, dl_vlan=$VLAN_TAP1, dl_type=$ETHER_TYPE_IP, nw_src=SENDER_IP, nw_dst=REFLECTOR_IP, nw_proto=$PTYPE_TCP,tp_dst=$TWAMP actions=output:tap1bp0 ovs-ofctl add-flow br-int "in_port=$BRINT_OFPORT_INGRESS, dl_vlan=$VLAN_TAP2, dl_type=$ETHER_TYPE_IP, nw_src=REFLECTOR_IP, nw_dst=SENDER_IP, nw_proto=$PTYPE_TCP,tp_dst=$TWAMP actions=output:tap2bp0

FIG. 22

```
mel 1
  level 2
  meg-net 1
    ccm-interval 1s
    meg-comp 5.3
      primary-vid 33
      back
    meg-comp 5.4
      primary-vid 44
      back
    meg-name-format string MEG-102
    mep 200
      active
      ccm-generate
      ccm-ltm-priority 1
      interface 5.3
      primary-vid 33
      back
    mep 201
      active
      ccm-ltm-priority 1
      interface 5.4
      primary-vid 44
      back
    mep-id-list 200,201
    back
  back
```

| FIG. 24 | FIG. 24A |
|---|---|
| | FIG. 24B |
| | FIG. 24C |
| | FIG. 24D |
| | FIG. 24E |
| | FIG. 24F |
| | FIG. 24G |
| | FIG. 24H |
| | FIG. 24I |
| | FIG. 24J |
| | FIG. 24K |
| | FIG. 24L |

\* Get all neighbor nodes of node 'obj' on Graph 'g'.
\* @param g
\* @param obj
\* @return

FIG. 24A

```
*/
private Set<Object> getNeighborSet(Graph g, Object obj) {
    Collection<Edge> edgeSet = g.getEdgesFrom(obj);
    Set<Object> neighborSet = new HashSet<Object>();
    for (Edge edge : edgeSet) {
        neighborSet.add(edge.getOther(obj));
    }
    return neighborSet;
}
```

FIG. 24B

```
/***
 * Do a depth first search in Graph 'g' for the 'target' node starting from the 'next' node, to list all the
 * paths that start with 'currPath', that are immediately followed by 'next', and that end at 'target'.
 *
 * @param g
 * @param currPath
 * @param next
 * @param target
 * @return
 */
@SuppressWarnings("unchecked")
private List<Stack<Object>> listPaths(Graph g, Stack<Object> currPath, Object next, Object target) {
    List<Stack<Object>> pathList = new ArrayList<Stack<Object>>();
    if (!currPath.contains(next)) {
        if (currPath.empty() || getNeighborSet(g, currPath.peek()).contains(next)) {
            currPath.push(next);
```

FIG. 24C

```
if (next.equals(target)) {
    pathList.add((Stack<Object>) currPath.clone());
}
else {
    Set<Object> neighborSet = getNeighborSet(g, next);
    for (Object neighbor : neighborSet) {
        List<Stack<Object>> viaNeighborPathList = listPaths(g, currPath, neighbor, target);
        for (Stack<Object> viaNeighborPath : viaNeighborPathList) {
            pathList.add((Stack<Object>) viaNeighborPath.clone());
        }
    }
}
currPath.pop();
```

```
    return pathList;
} private String networkPathToString(List<DevicePort> networkPath) {
    StringBuilder sb = new StringBuilder();
    for (DevicePort devicePort : networkPath) {
        sb.append(devicePort.toString() + " ");
    }
    return sb.toString();
}
```

```
/**
 * Compute list of all possible paths from sourcePort to targetPort on the networkGraph.
 *
 * @param networkGraph
 * @param sourceDevicePort
 * @param targetDevicePort
 * @return
 */
private List<List<DevicePort>> createNetworkPathList(
        Graph networkGraph,
        DevicePort sourceDevicePort,
        DevicePort targetDevicePort) {
    if ( logger.isDebugEnabled()) {
        logger.debug("Constructing list of all network paths from " + sourceDevicePort.toString() +
                " to " + targetDevicePort.toString());
    }
```

FIG. 24F

```
List<List<DevicePort>> networkPathList = new ArrayList<List<DevicePort>>();
List<Stack<Object>> pathList = listPaths(networkGraph, new Stack<Object>(),
                sourceDevicePort, targetDevicePort);
logger.info("Identified the following " + pathList.size() + " distinct network paths from " +
        sourceDevicePort.toString() + " to " + targetDevicePort.toString());
for (Stack<Object> stack : pathList) {
    List<DevicePort> networkPath = new ArrayList<DevicePort>();
    for (Object obj : stack) {
        networkPath.add((DevicePort) obj);
    }
    logger.info(" Network Path: " + networkPathToString(networkPath));
    networkPathList.add(networkPath);
}
```

FIG. 24G

```
        return networkPathList;
}

/**
 * Create a Graph consisting of devices in the service order as nodes, and the interconnections
 * between them as the edges. The graph is used for determining network paths for service
 * activation testing.
 * @param serviceOrderID
 * @return
 */
@SuppressWarnings("rawtypes")
private Graph createNetworkGraph(Long serviceOrderID) {
    if ( logger.isDebugEnabled() ) {
        logger.debug("Creating network graph for serviceOrderID=" + serviceOrderID);
    }
    Graph networkGraph = new Graph();
```

FIG. 24H

```
List<ServiceOrderInterConnection> soicList =
    dbUtils.retrieveUnexpandedServiceOrderInterConnections(serviceOrderID);

Map<Long,List<DevicePort>> vnfIdToDevicePortListMap = new
    HashMap<Long,List<DevicePort>>();
for (ServiceOrderInterConnection soic : soicList) {
    DevicePort dp1 = new DevicePort(soic.getEndpoint1().getDevice(),
                                    soic.getEndpoint1().getPort(), false);

networkGraph.addNode(dp1);
    Device d1 = dp1.getDevice();
    if (d1.isVirtualizedNetworkFunction()) {
        List<DevicePort> vnfDevicePortList = vnfIdToDevicePortListMap.get(d1.getId());
        if (null == vnfDevicePortList) {
            vnfDevicePortList = new ArrayList<DevicePort>();
            vnfIdToDevicePortListMap.put(d1.getId(), vnfDevicePortList);
        }
        vnfDevicePortList.add(dp1);
```

```
        DevicePort dp2 = new DevicePort(soic.getEndpoint2().getDevice(),
                              soic.getEndpoint2().getPort(), false);

networkGraph.addNode(dp2);
        networkGraph.addEdge(new Edge(dp1, dp2, false)); // false => not a directed graph
        Device d2 = dp2.getDevice();
        if (d2.isVirtualizedNetworkFunction() {
            List<DevicePort> vnfDevicePortList = vnfIdToDevicePortListMap.get(d2.getId());
            if (null == vnfDevicePortList) {
                vnfDevicePortList = new ArrayList<DevicePort>();
                vnfIdToDevicePortListMap.put(d2.getId(), vnfDevicePortList);
            }
            vnfDevicePortList.add(dp2);
        }
    }
```

FIG. 24K

```
// Add edges corresponding to connection from VNF ports to VNF "switch fabric"
for (Long vnfId : vnfIdToDevicePortListMap.keySet()) {
    Device d = dbUtils.getDeviceByID(vnfId);
    Object vnfFabricDevicePort = new DevicePort(d, new Port(d.getName(), d), true);
    networkGraph.addNode(vnfFabricDevicePort);
    for (DevicePort devicePort : vnfIdToDevicePortListMap.get(vnfId)) {
        networkGraph.addEdge(new Edge(devicePort, vnfFabricDevicePort,
            false)); // false => not a directed graph
    }
}
```

```
if ( logger.isDebugEnabled() ) {
    logger.debug("Created network graph for serviceOrderID=" + serviceOrderID);
}
for (Object node : networkGraph.getNodes()) {
    if ( logger.isDebugEnabled() ) {
        logger.debug("Node: " + node.toString());
    }
}
for (Edge edge : networkGraph.getEdges()) {
    if ( logger.isDebugEnabled() ) {
        logger.debug("Edge: from " + edge.getFrom().toString() + " to " + edge.getTo().toString());
    }
}
return networkGraph;
}
```

FIG. 24L

VERIFICATION OF NETWORK SERVICE PATHS

This application claims benefit of U.S. Provisional Patent Application Ser. No. 62/026,664 filed on Jul. 20, 2014 for Verification of IP Service Paths. The '664 application is incorporated by reference in its entirety.

BACKGROUND

Field of the Disclosure

This disclosure relates generally to verification of the continuity of the network service path, traversing through both network functions and the intervening links. The network functions may be implemented by physical appliances such as routers and firewalls, or by virtual network functions (VNFs) that are implemented by software images running in virtual machines (VMs). This disclosure addresses both out-of-service testing and in-service testing. For this disclosure and the claims that follow, out-of-service testing refers to path continuity verification that is done before the service is delivered to the customer. In contrast, in-service testing refers to path continuity verification, when the service delivered to the customer is in active use. Network functions are not removed from the network service path during in-service testing.

As noted in greater detail below, packets can be classified as service packets, such as TCP/IP packets that are used to achieve the ends of the customer. Another group of packets can be classified as test packets as the purpose of the test packets is to test one or more portions of the network.

Network services include popular applications such as Internet Access, Virtual Private Networks (VPNs), Web/Email Filtering, Intrusion Detection Systems (IDS), Intrusion Prevention Systems (IPS), Session Border Controller (SBC) and others. These services are often provided and managed by Communication Service Providers (CSPs). The CSPs are responsible for continuously ensuring that the service is accessible, operational and meets the needs of the subscriber.

An example service is shown in FIG. 1. The service is implemented in a number of network elements that are connected to provide a service. A user computer 104 is connected to a server 108 by a network service path 112 that passes through a security device 116 and a customer router 120 before traversing the provider backbone 124. The security device can be a firewall or an intrusion detection system (IDS) or some other type of security device. Thus the customer network 128 including the user computer 104 is connected to the provider backbone 124. Those of skill in the art will recognize that the Network service path 112 actually travels through physical connections such as cables or wireless connections. As this fact is understood, it is not necessary to clutter the drawings with the physical connections in order to highlight the existence or non-existence of Layer 2 and Layer 3 communication paths.

The service shown in FIG. 1 is implemented with physical appliances including the security device 116 and a customer router 120. These functions can also be implemented by virtual equivalents.

FIG. 2 shows that the customer router 120 (FIG. 1) has a virtualized customer router 220. As will be shown in detail in FIG. 3, the virtualized customer router may have a virtual switch on either side of a virtual customer router.

FIG. 3 shows an implementation where the entire network service path has been replaced by equivalent VNFs 220 and 216 with no loss of functionality. FIG. 4 shows the pair of VNF devices from FIG. 3 but with switches that may be automatically generated by a program such as Open Stack.

Thus, customer router 220 may have a pair of virtual switches 242 and 244. Alternatively, a VNF such as security device 216 may have one virtual switch 242 attached that uses a pair of VLANs to partition the virtual switch 242 into multiple disjoint logical switches. (This partitioning is described in connection with FIG. 15 and FIG. 16.) Virtual switches may be used to increase the number of virtual ports.

For the remainder of this disclosure the network service path will be shown with software VNFs implementing the service functions. This implementation is equivalent to a service built with physical appliances, so physical variants may not be shown. Unless specifically stated to the contrary, any teaching provided for use on an implementation using virtual components could be extended to alternatives where some or all of the virtual components are replaced with physical components.

The service provider is responsible for ensuring the operation of the service, including the end-to-end connectivity.

FIG. 5 illustrates an example of using a tester 204 and a loopback 212 to verify the continuity of the test path 208 subset of the network service path 112. Those of skill in the art will recognize that tester 204 and 214 (tester 214 introduced in FIG. 8) may be realized using traffic generators that provide packets used in testing portions of a network. Other types of tester devices will be apparent to those of skill in the art. For example, one could use a laptop to send a ping or other test packet.

Assurance of the service is complicated by the fact that some of the component functions of the service are asymmetric and/or impervious to test protocols. An example is shown in FIG. 6.

In FIG. 6, the test packets on test path 208 are able to traverse the customer router 120, but they are blocked by the security device 116 as shown by the test blocked "X" 218. Complete verification of the path is therefore not possible.

One way to address the failed verification would be to modify the network functions such as the security device 116 to pass test packets. This is not optimal because the range of test functions that may be used is wide. Many different test packets would need to be able to pass through security device 116 which would be undesirable. There are at least two undesirable results. It is undesirable as maintaining a set of special pathways for many different types of test packets complicates maintenance. If it also undesirable as every tunnel opened for test packets become a potential vulnerability to nefarious packets

SUMMARY OF THE DISCLOSURE

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept.

Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Other systems, methods, features and advantages of the disclosed teachings will be or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

FIG. 11 is a view of an Ethernet packet.

FIG. 12 is a view of an Ethernet packet with IP content.

FIG. 13 (with partial views in FIG. 13A to FIG. 13C) is an example of code to set up a bypass.

FIG. 17 is an example of the code to distinguish the Network service Packets and Test Packets based on a Destination MAC address.

FIG. 18 is an example of the code to distinguish the Network service packets 550 and test packets 500 based on a MAC source address 508.

FIG. 19 is an example of the code to distinguish the Network service packets 550 and test packets 500 based on a Layer 2 Ethertype 512.

FIG. 20 is an example of the code to distinguish the Network service packets 550 and test packets 500 based on a VLAN tag.

FIG. 21 is an example of the code to distinguish packets based upon the IP protocol carried in the packet.

FIG. 22 is an example of code to trigger generation of Layer 2 connectivity test messages.

FIG. 24 (with partial views in FIG. 24A-FIG. 24L) is a Java Code Snippet for the construction and analysis of network graph and extraction of network service paths to verify.

DETAILED DESCRIPTION

Glossary

Bypass mechanism—A mechanism that can be used to divert network packets over an alternate path instead of a normal path between two points in a network. The two points could be two interfaces of the same network device, in which case the bypass mechanism simply enables network packets to skip traversing the device. A bypass mechanism could be implemented in a number of ways as a physical or virtual device including: as a physical link; as a bridge or switch with a VLAN translating flow, rather than just a link; as a "flow" defined inside another bridge or switch; as a virtual cable such as a Linux veth pair or any other kind of virtual link, or a combination of two or more of these examples.

In-service verification—Verification of some property of interest associated with a service, during a period of time when the service is in active use.

Network function—A real or virtual device that receives, processes and filters or forwards network packets based on information contained in the packet itself, and on other sources of information including the current state and topology of the network and policies configured in the network. Routers, switches and firewalls are examples of network functions.

Network service—A network service is a facility, made available to a user by a provider, which is implemented over a network maintained by the provider. Examples of network services are Internet Access and Virtual Private Networks.

Network service path—The network path consisting of the links and network functions followed by a packet involved in providing a network service, as the packet travels from its source device to its destination device.

Physical device—A hardware device dedicated to implementing a network function. For example, a router/firewall in a home network.

Test packet—A network packet whose sole purpose is to test or verify some property (such as reachability or path continuity) of the network that it traverses, and that is distinct from network packets involved in providing an end-user service.

Virtual Device—A network function implemented in software that runs on general purpose hardware, and that may co-exist with other virtual devices on the same hardware.

DESCRIPTION

Thus, while the prior art included some ways to partially test a network before it was put into service by adding loopbacks, the need remained to provide mechanisms for more extensive out-of-service testing and in-service testing.

Figure 6:
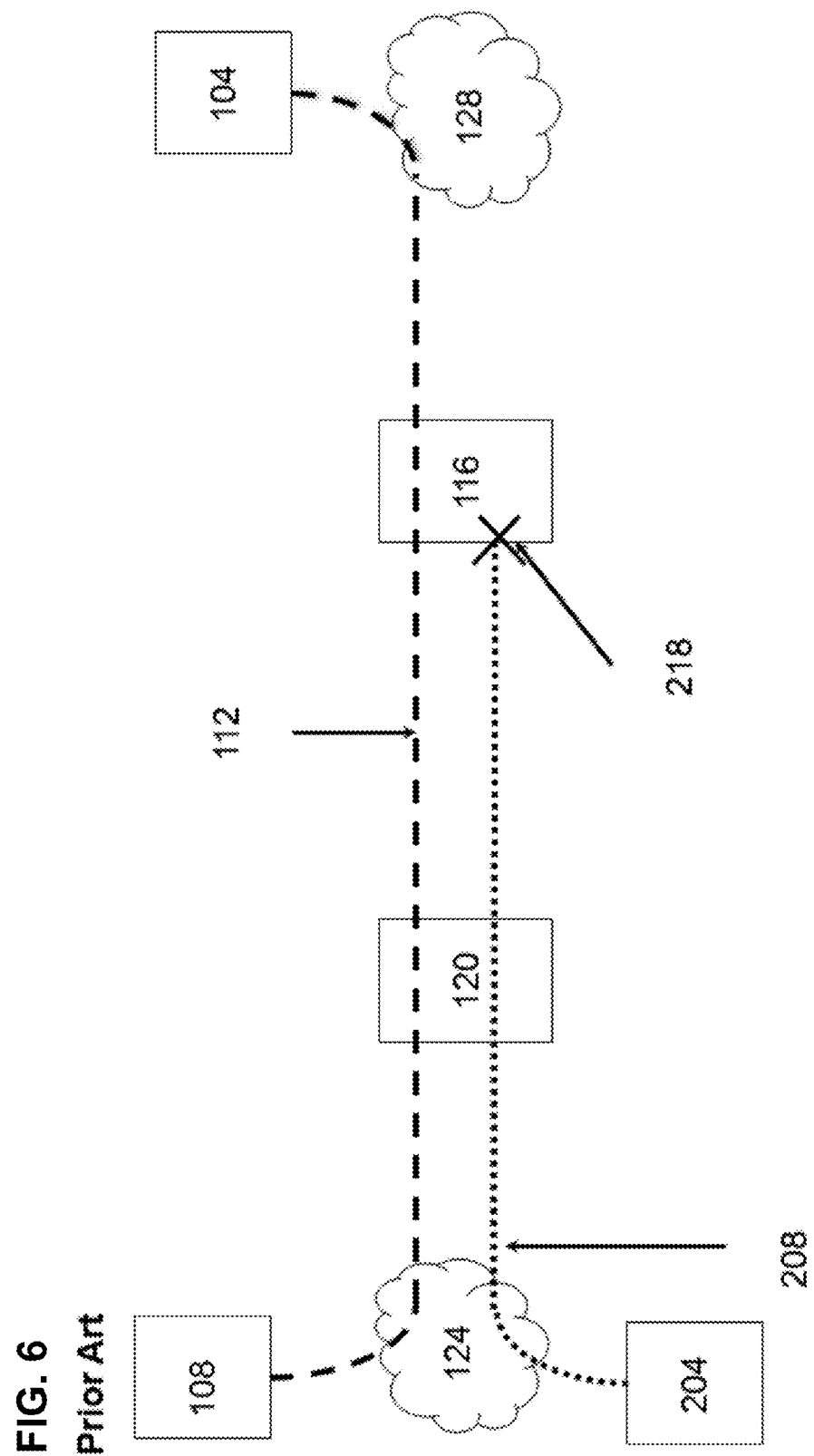
FIG. 6 is a view of a failed attempt to verify a layer 3 network service path.

As a reminder, in FIG. 6, discussed above, the test packets on test path 208 are able to traverse the customer router 120, but they are blocked by the security device 116 as shown by test blocked "X" 218. Complete verification of the network service path is therefore not possible.

Figure 7:
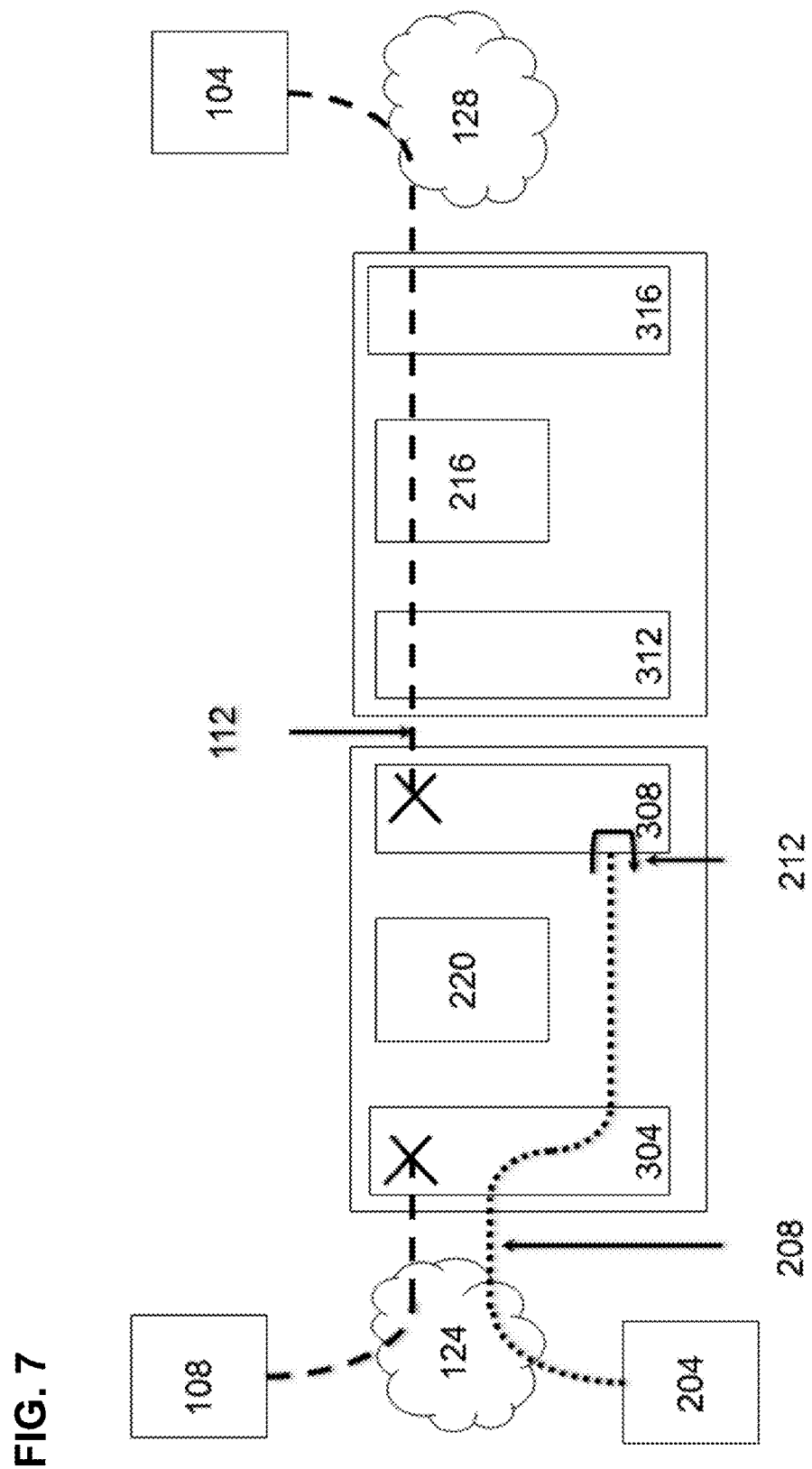
FIG. 7 is a view of using switches to partially verify a layer 3 network service path.

When the network service path is implemented in a virtualized manner then the virtual switches may be used to temporarily remove components of the service. FIG. 7 is a view of a case where the virtual switch 304 and virtual switch 308 are configured to bypass the virtual customer router 220 to allow a test path 208 to extend to virtual switch 308. Once the test path 208 is verified then virtual customer router 220 is restored to the network service path 112.

The switches 312 and 316 can be assessed by either running a test from tester 214 (See FIG. 8) or by moving the loopback 212 from switch 308 to switch 316 and sending packets generated by tester 204 to bypass both VNF devices (220 and 216) which are both out of service. The testing of out of service components can be extended to more than two customer components (physical or virtual).

Figure 1:
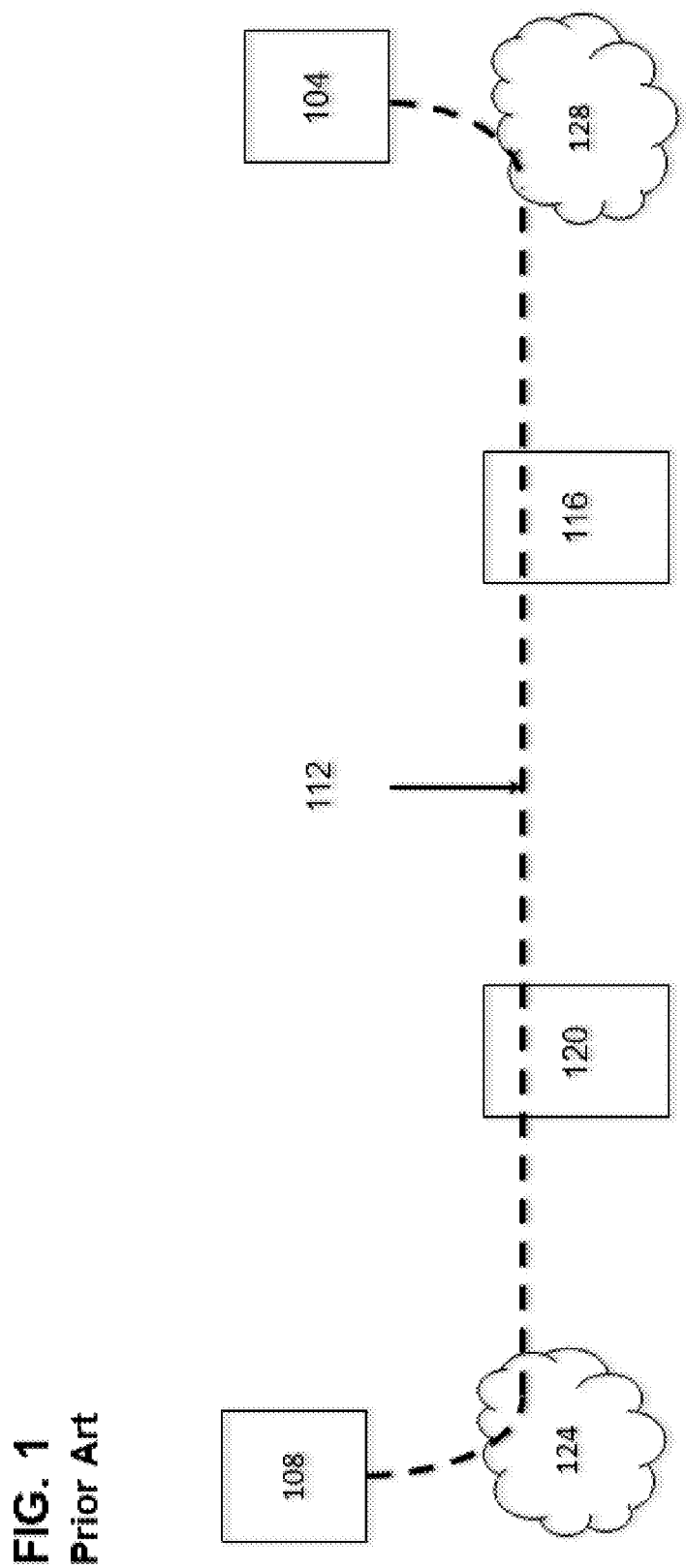
FIG. 1 is a view of a typical layer 3 network service path.
Figure 2:
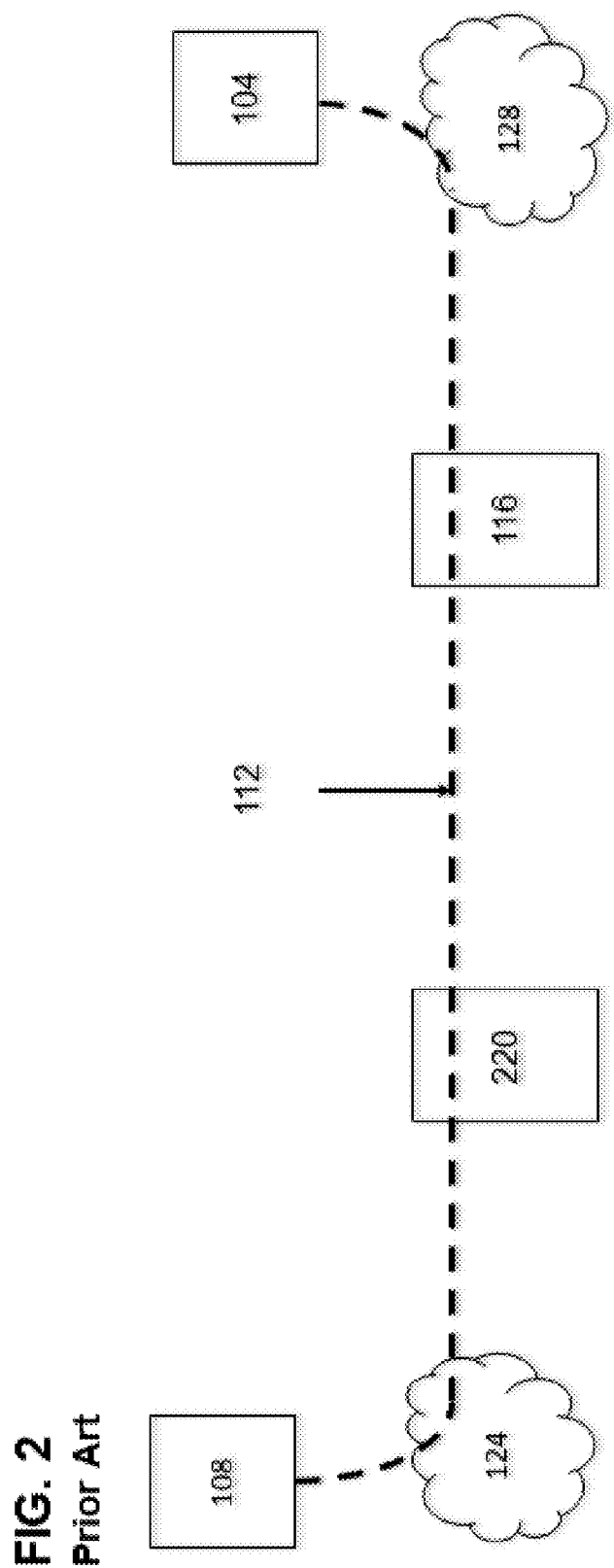
FIG. 2 is a view of replacing a physical appliance with a virtual function.
Figure 3:
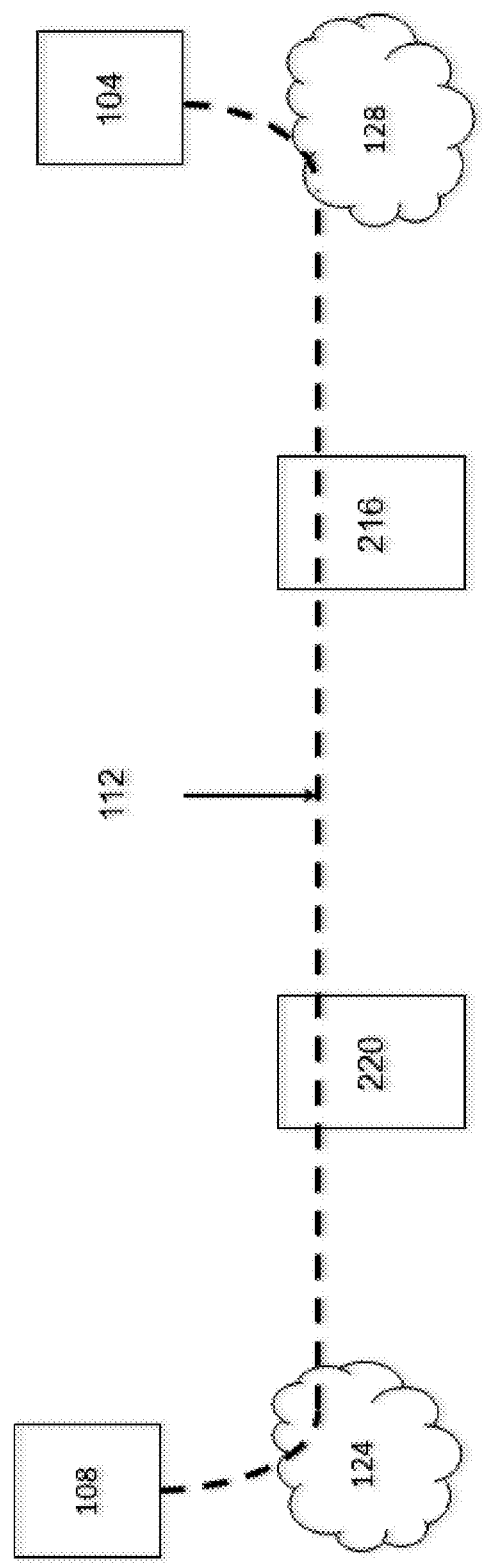
FIG. 3 is a view of a layer 3 network service path using virtualized components.
Figure 4:
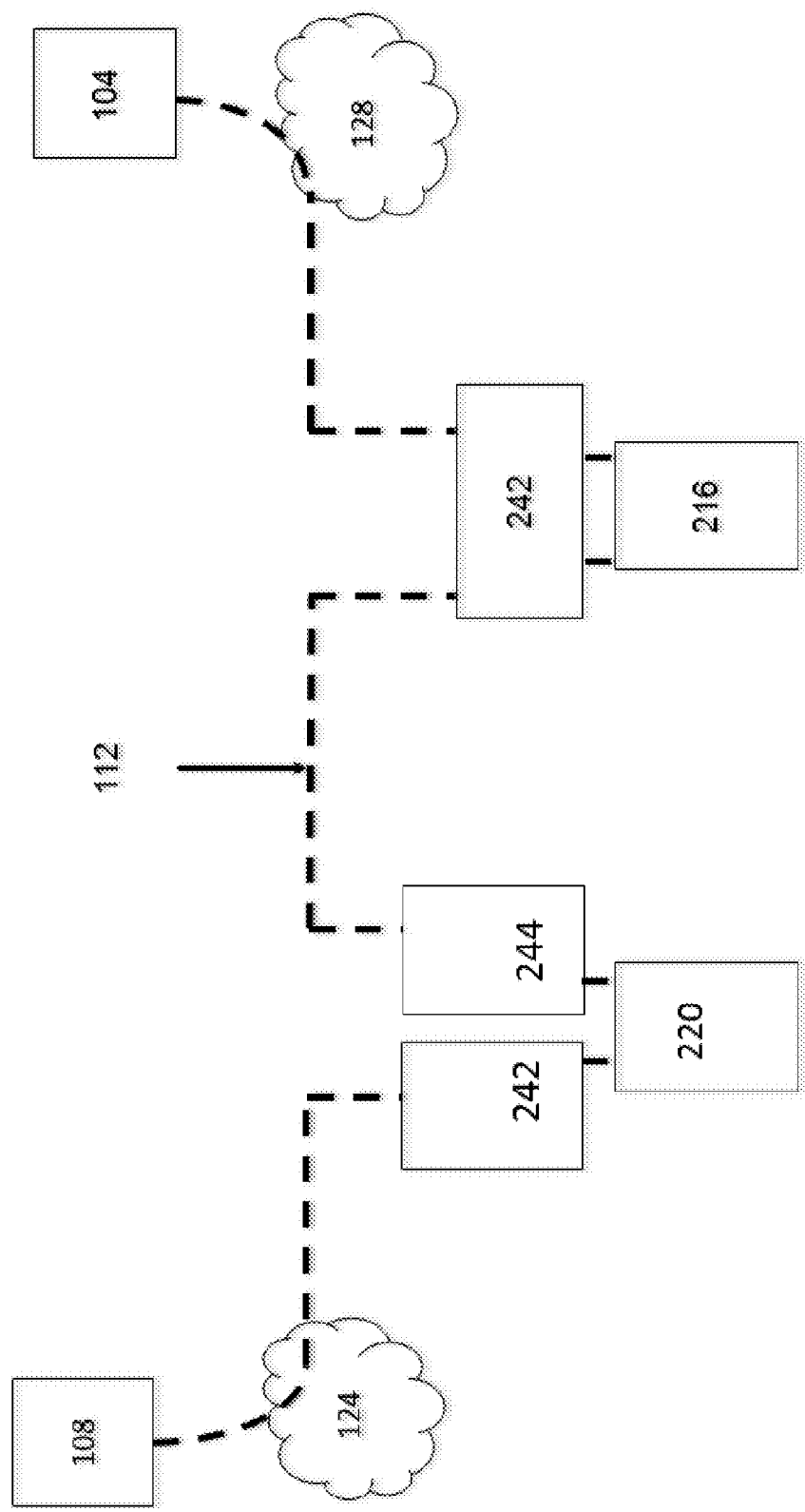
FIG. 4 shows the pair of VNF devices from FIG. 3 but with virtual switches.
Figure 5:
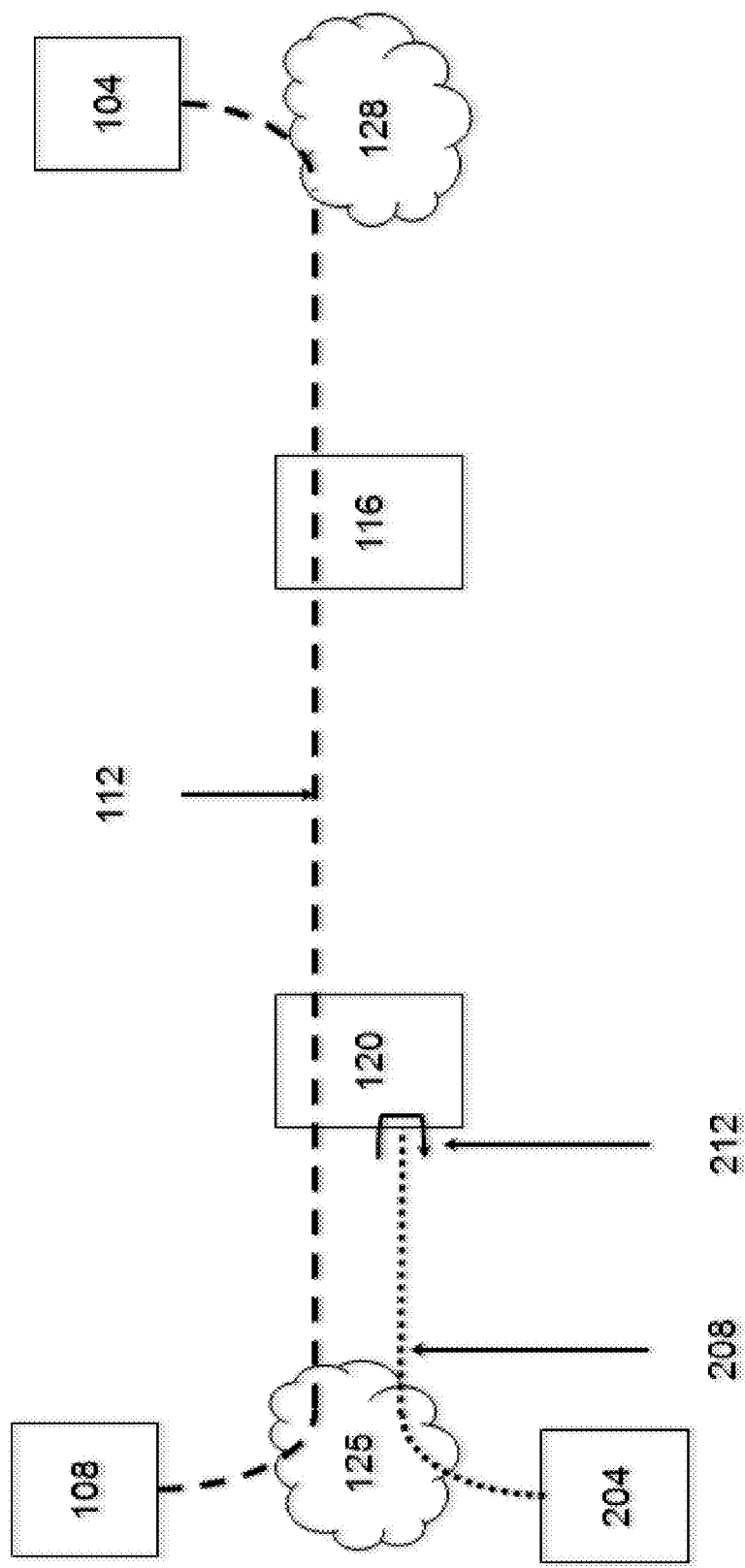
FIG. 5 is a view a partial verification of a layer 3 network service path.
Figure 8:
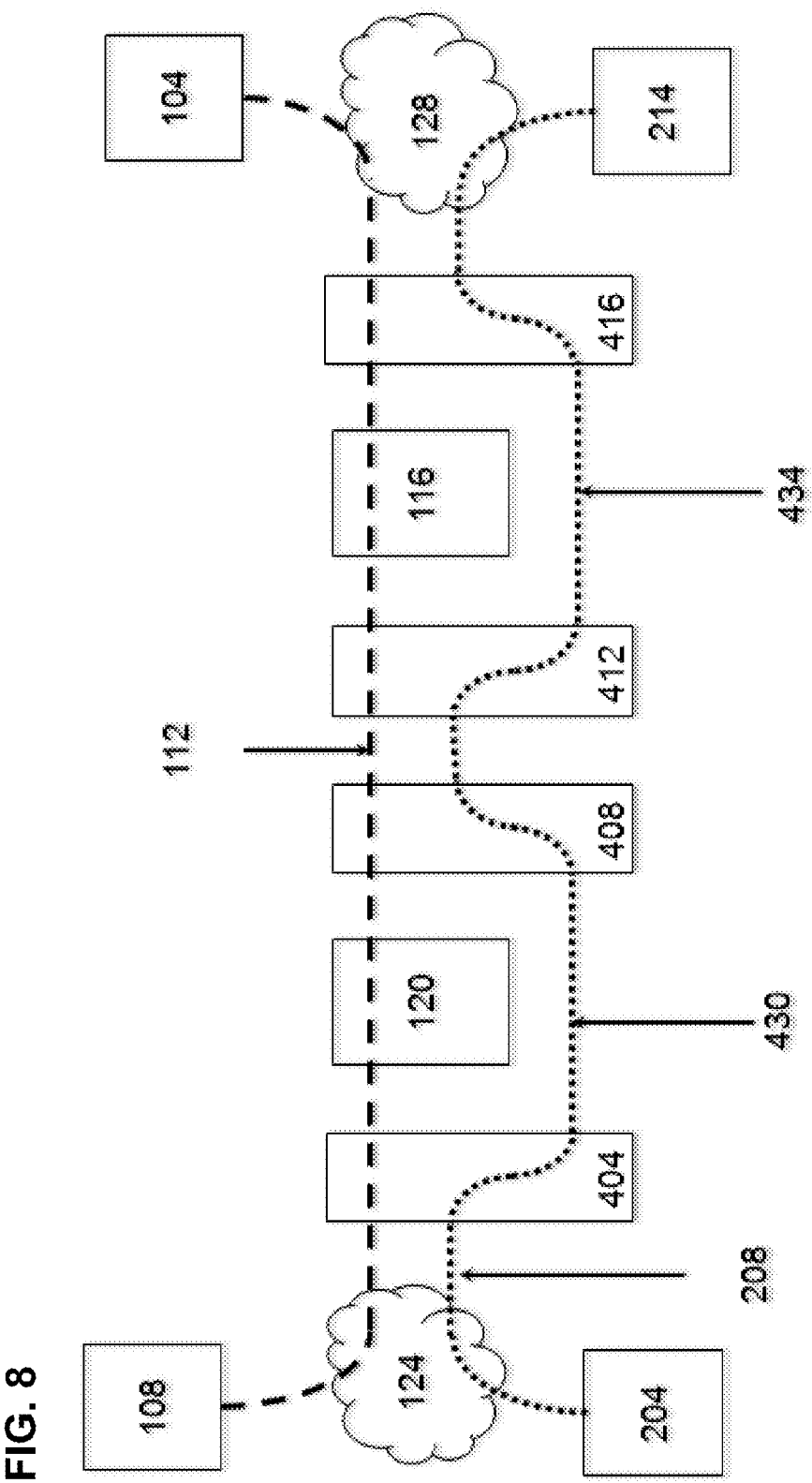
FIG. 8 is a view of using switches and bypass mechanisms to verify a layer 3 network service path built using physical appliances.

As shown in FIG. 8, the original service of FIG. 1 is augmented by the configuration of physical switches 404, 408, 412, and 416 and bypass mechanism 430 around the customer router 120 and bypass mechanism 434 around the security device 116. Those having ordinary skill in the art will recognize that a bypass mechanism could be implemented in a number of ways. The bypass mechanism could be implemented with a physical link. The bypass mechanism could be implemented as a bridge or switch with a VLAN translating flow, rather than just a link. The bypass mechanism could be a "flow" defined inside another bridge or switch. The bypass mechanism could be implemented as a virtual cable such as a Linux veth pair or any other kind of virtual link, or a combination of two or more of these examples. These additional switches and bypass mechanisms allow a test packet to bypass the network elements (120 and 116) and still verify the network connections between:

Tester 204 through provider backbone 124 and to switch 404;
Switch 408 and switch 412; and
Switch 416 and customer network 128 to tester 214.

In FIG. 8 the network functions (customer router 120 and security device 116) as well as the switches 404, 408, 412, and 416 are physical devices. This can also be done using some virtualized network functions (VNF) running in a Hypervisor environment.

Figure 9:
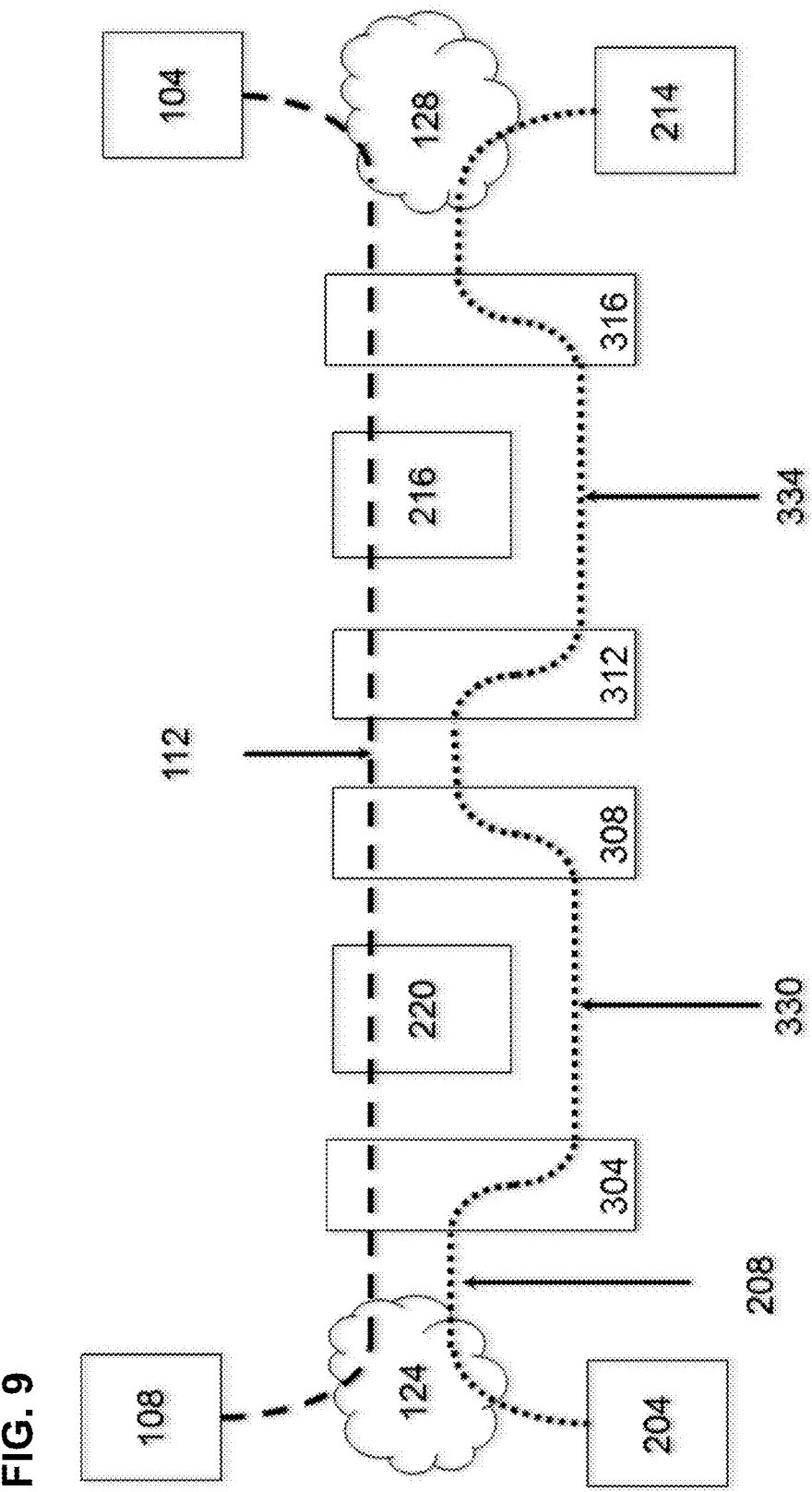
FIG. 9 is a view of using switches and bypass mechanisms to verify a layer 3 network service path built using virtual network functions.

FIG. 9 shows an example of using VNFs 220 and 216, and virtual switches 304, 308, 312, and 316 to implement the network service path 112. Bypasses 330 and 334 allow the test packets to flow between tester 204 and tester 214 while bypassing VNFs 220 and 216.

Figure 10:
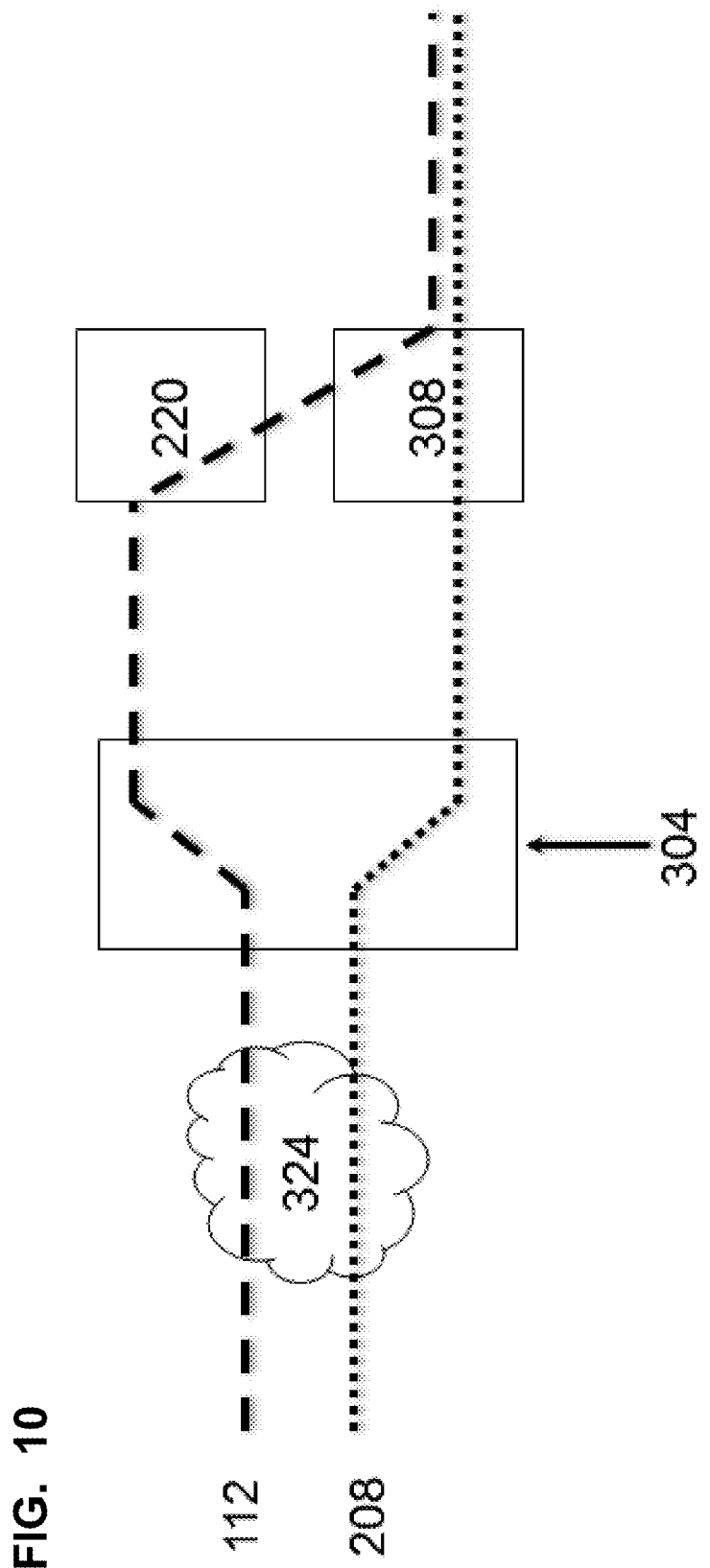
FIG. 10 is a view of the separation of test packets from service packets.

FIG. 10 provides additional details of the virtual switch 304 from FIG. 9. Network service packets on the network service path 112 and test packets on the test path 208 traverse a combined path 324 and reach virtual switch 304. The virtual switch 304 distinguishes between the Network service packets on network service path 112 and the test packets on test path 208.

The network service path 112 is connected to customer router 220 and the test path 208 bypasses the virtual customer router 220 to connect to virtual switch 308. Those of skill in the art will appreciate that while network service path 112 and test path 208 are shown as two distinct paths in order to emphasize the teachings of the present disclosure both paths may connect to switch 304 through a single ingress port.

FIG. 11 shows an Ethernet test packet. The Ethernet test packet 500 has destination address 504, source address 508, VLAN value 510; Ethertype 512, SOAM header 516, and SOAM MEG field 520. MEG is an acronym for Maintenance Entity Group. SOAM stands for Service OAM. OAM stands for Operation, Administration and Maintenance. The details of Ethernet SOAM use is beyond the scope of the present disclosure but well understood by those of skill in the art.

FIG. 12 represents a service packet 500 which is an Ethernet packet with IP content. Service packet 550 has destination address 504, source address 508, VLAN value 510, Ethertype 512 as did test packet 500. However, service packet 550 has IP header 554 and IP payload 558.

As indicated in FIG. 10, test packets on test path 208 may be shunted away from a VNF's input interface and may rejoin the data packet stream coming out of the VNF's output interface using a bypass device that bypasses the VNF. For example, bypass 330 around a VNF (customer router 220) connects virtual switch 304 with virtual switch 308 (See FIG. 9). Tap1 and Tap2 are the names given to points of attachments of a VNF to the pair of virtual switches on either side of VNF in the example below. The bypass created (analogous to bypass 330 or 334 in FIG. 9) in the code set forth below is called by different names for different portions of the bypass.

Bash Code Snippet—Setting Up a Bypass Between Two Interfaces of a VNF:

FIG. 13 is an example of code to set up a bypass as shown in FIG. 9. The transition between the representation shown in FIG. 9 to the Bash Code Snippet shown above can be illustrated in a few steps.

Figure 14:
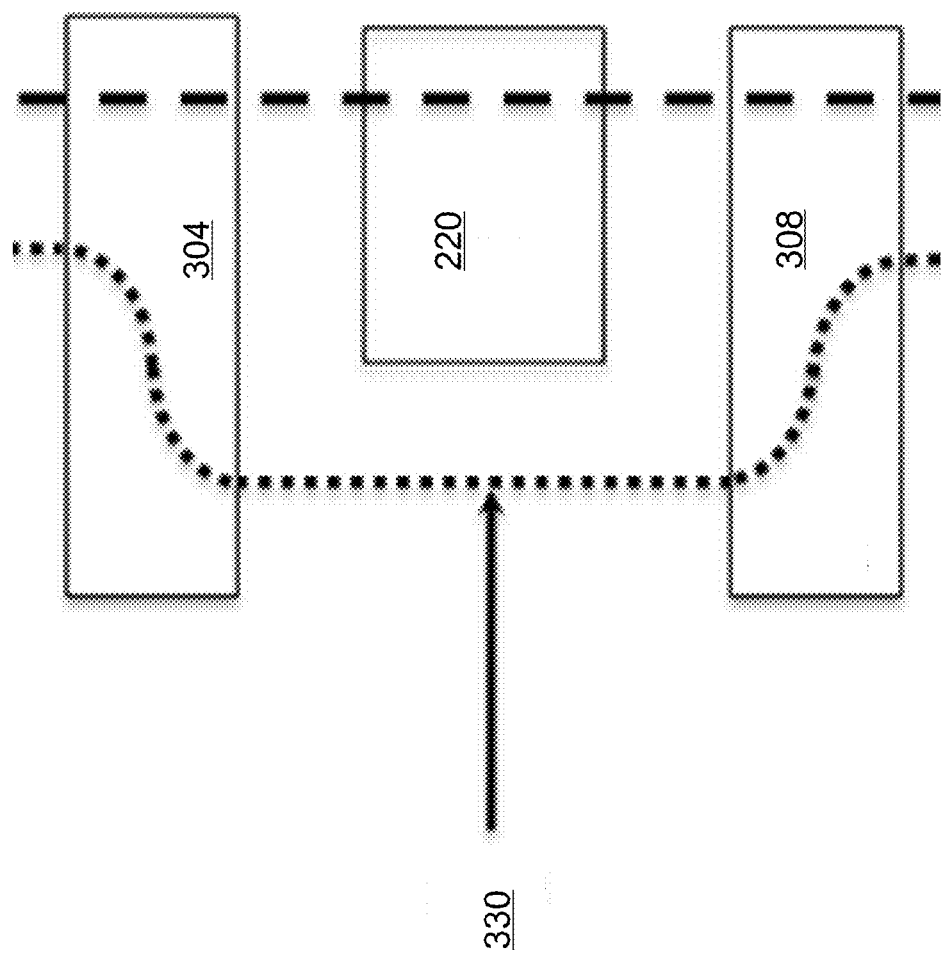
FIG. 14 shows a portion of FIG. 9 rotated 90 degrees.

FIG. 14 shows a portion of FIG. 9 rotated to show bypass 330 as essentially vertical rather than horizontal.

The path for service packets in FIG. 9 traveling from provider backbone 124 towards customer network 128 is:
Into virtual switch 304
Into virtual customer router 220
Into virtual switch 308 and
Onward to next component.

The path for test packets in FIG. 9 traveling from provider backbone 124 towards customer network 128 is:
Into virtual switch 304
Into bypass 330
Into virtual switch 308 and
Rejoining the service packets to go onward to next component.

Figure 15:
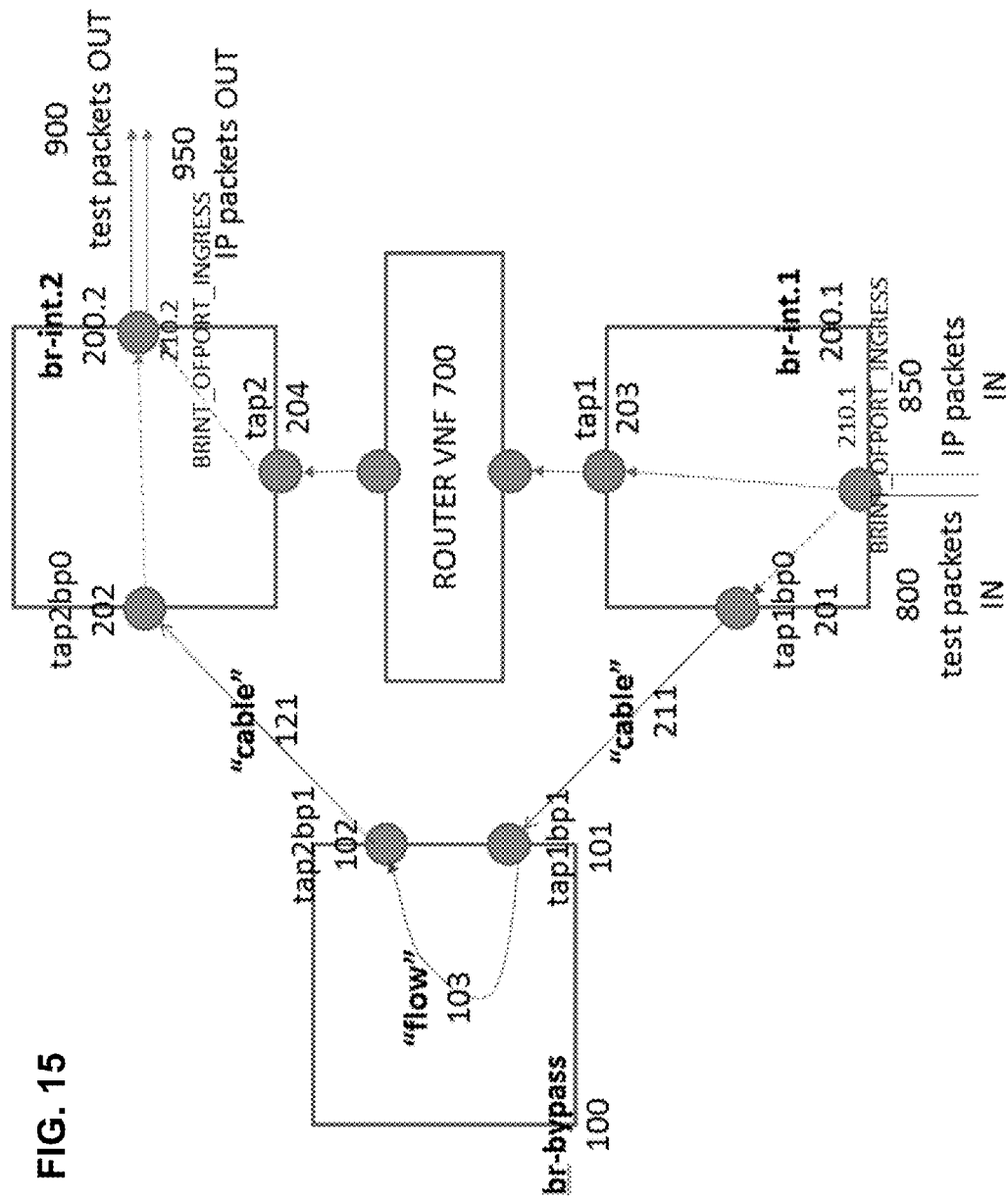
FIG. 15 shows a bypass using cable, flow in br-bypass, and a second cable.

FIG. 15 shows an analogous pair of paths.
The path for service packets in FIG. 15 is:
Into virtual switch br-int.1 via BRINT_OFPORT_INGRESS
Out of virtual switch br-int.1 via tap1 and into virtual customer router
Out of virtual customer router and into second virtual switch ("br-int.2") via tap2.
Out of br-int.2 via BRINT_OFPORT_INGRESS to go onward to next component.

The path for test packets in FIG. 15 is:
Into virtual switch br-int.1 via BRINT_OFPORT_INGRESS
Out of virtual switch br-int.1 via tap1bp0 and into "cable"
Out of Cable and into bypass ("br-bypass") via tap1bp1
Through br-bypass via "flow" to tap2 bp1
Out of br-bypass via tap2bp1 to a second cable
Out of the second cable into the second switch ("br-int.2") via tap2bp0.
Out of br-int.2 via BRINT_OFPORT_INGRESS to go onward to next component.

It should be clear that entities in FIG. 15 correspond to entities in FIG. 14 in the following manner:

| FIG. 15 | FIG. 14 |
|---|---|
| br-int.1 | 304 |
| br-int.2 | 308 |
| Cable 211, br-bypass 100 (including 101 and 102), flow 103, cable 121 | 330 |
| Router VNF 700 | 220 |

Figure 16:
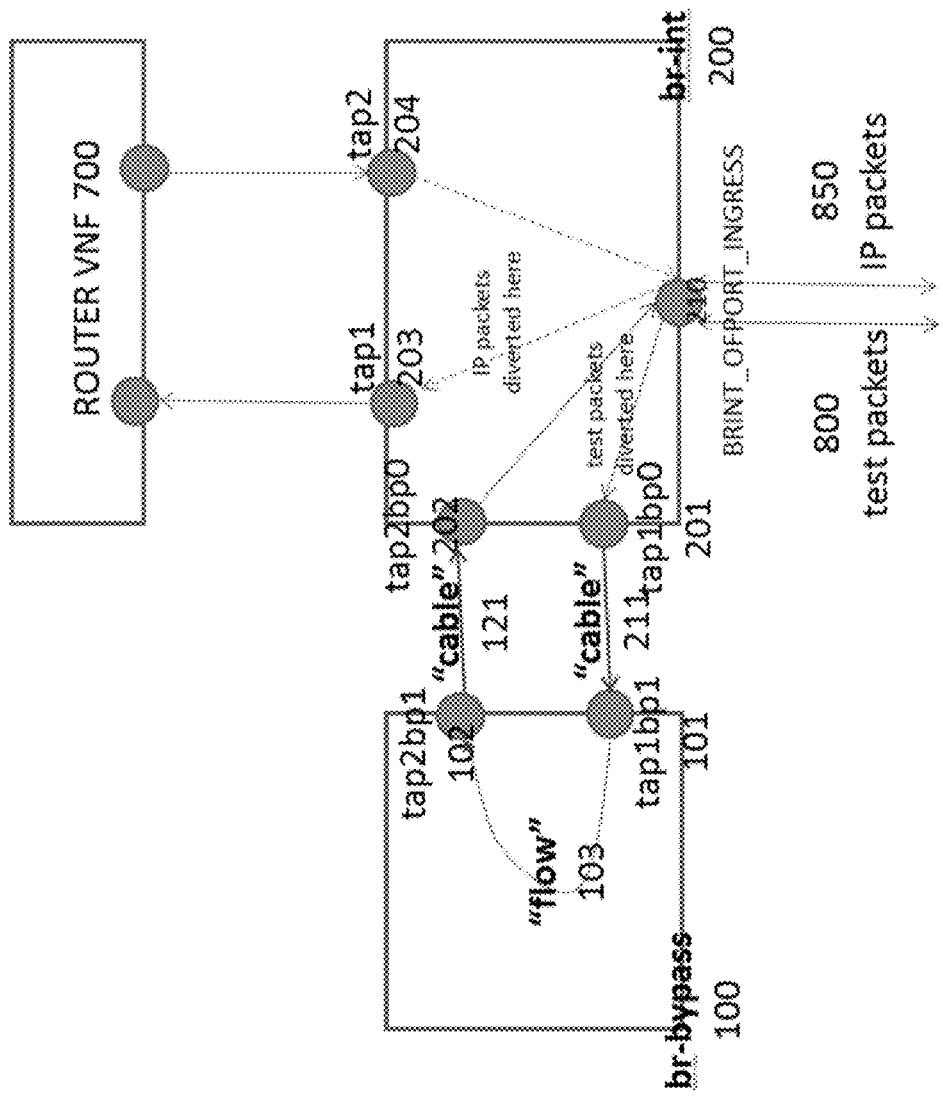
FIG. 16 shows a bypass with the two bridges from FIG. 15 merged as a single VLAN-aware bridge.

While FIG. 15 maps well to FIG. 14 (a rotated view of a portion of FIG. 9), to best understand the code snippet, it is useful to view a modification as shown in FIG. 16. The two bridges br-int.1 and br-int.2 of FIG. 15, are merged into a single VLAN-aware bridge br-int 200 in FIG. 16, by partitioning the ports of br-int into two sets using VLANs. Ports tap1 and tap1bp0 in FIG. 16 are associated with one VLAN (corresponding to br-int.1 in FIG. 15), while ports tap2 and tap2bp0 in FIG. 16 are associated with a different VLAN (corresponding to br-int.2 in FIG. 15). The two ports marked BRINT_OFPORT_INGRESS in FIG. 15 are merged into a single trunk port with the same name in FIG. 16.

The path for service packets in FIG. 16 is:
Into virtual switch br-int via BRINT_OFPORT_INGRESS
Out of virtual switch br-int.1 via tap1 and into virtual customer router
Out of virtual customer router and back into virtual switch br-int via tap2.
Out of br-int via BRINT_OFPORT_INGRESS to go onward to next component.

The path for test packets in FIG. 16 is:
Into virtual switch br-int via BRINT_OFPORT_INGRESS
Out of virtual switch br-int via tap1bp0 and into "cable"
Out of Cable and into bypass ("br-bypass") via tap1bp1
Through br-bypass via "flow" to tap2bp1
Out of br-bypass via tap2bp1 to a second cable
Out of the second cable and back into the virtual switch br-int via tap2bp0.
Out of br-int via BRINT_OFPORT_INGRESS to go onward to next component.

A person having ordinary skill in the art will recognize that the code snippet establishes the pathways described in FIG. 16 which was shown via intermediate step FIG. 15 to be a virtual bypass such as shown as 330 in FIG. 9

Identifying Test Packets to Divert into the Bypass.

Having a bypass bridge is one part of the solution. A second part of the solution is to know how to separate test packets from service packets so that the test packets can be diverted. This disclosure provides a series of examples of how the test packets could be identified for bypass. Those of skill in the art will be able to set up additional ways to identify test packets. The ways for identifying test packets may vary with the type of test packets used.

Use of Destination MAC Address.

One embodiment of the disclosure is to distinguish the Network service Packets and Test Packets based on a Destination MAC address.

Bash Code Snippet—Separation Using MAC DA.

All packets with a destination address of 01:80:c2:00:00:32 (SOAM multicast) received on the ingress port of br-int and heading towards tap1 or tap2 are diverted towards the bypass bridge instead. 01:80:c2:00:00:30-01:80:c2:00:00:37 is a range of multicast addresses reserved for SOAM CCM. The last digit corresponds to the MEG. FIG. 17 is an example of the code to implement this type of discernment.

Using MAC Source Address.

Another embodiment is to distinguish the Network service packets 550 and test packets 500 based on a MAC source address 508.

Bash Code Snippet—Separation using MAC SA.

All packets with a source address 508 matching the variable $CPE_SWITCH_MAC received on the ingress port of br-int and heading towards tap1 or tap2 are diverted towards the bypass bridge instead.

FIG. 18 is a set of code to implement this type of discernment.

Using Layer 2 Ethertype.

Another embodiment of the disclosure is to distinguish the Network service packets 550 and test packets 500 based on a Layer 2 Ethertype 512.

Bash Code Snippet—Separation using Ethertype.

All packets with an Ethertype 512 matching the variable $PATH_VERIFY_PROTO received on the ingress port of br-int and heading towards tap1 or tap2 are diverted towards the bypass bridge instead. PATH_VERIFY_PROTO is the Ethernet ptype of some protocol used for path verification. In the OSI model Ethernet is a layer 2 protocol. In the Ethernet frame there is a field called Ethertype that indicates the nature of the payload. Values of interest to us would be 0x0800 for IP, 0x0806 for ARP, 0x8902 for CFM/SOAM, etc. FIG. 19 provides an example of code to perform this type of discernment.

Using VLAN Tag.

Another embodiment of the disclosure is to distinguish the Network service packets 550 and test packets 500 based on a VLAN tag. A switch may be configured to separate packets based on VLAN as shown below. One can tag test traffic and data traffic with different VLAN tags.

Bash Code Snippet—Separation using VLAN.

All packets with a VLAN matching the variable $OAM_VLAN received on the ingress port of br-int and heading towards tap1 or tap2 are diverted towards the bypass bridge instead. The VLAN value 510 appears between source address 508 and Ethertype 512 for both test packets 500 and service packets 550. FIG. 20 shows an example of code to implement this type of discernment.

Using IP Protocol.

Another embodiment is to distinguish the Network service packets 550 and test packets 500 based on the IP protocol carried in the packet. Thus, rather than using SOAM test packets, a subset of IP packets are used as test packets. The IP packets used as test packets will need to be marked so that they can be discerned as test packets and sent to the bypass. As previously noted, routers and security devices are often asymmetric devices. Referencing FIG. 7, while a ping or certain other test packets can pass from tester 214 on the customer network 128 to tester 204 connected to the provider backbone 124, the same type of test packets cannot pass through customer router 120 or security device 116 when traveling in the reverse direction from tester 204 to tester 214. To test the route from 204 to 214, bypasses 430 and 434 would be needed. Those having ordinary skill in the art will recognize that in for some VNF components, it may not be desirable to bypass IP packets around the component (such as router). Thus, a bypass selection tool useful in some situations may not be useful in all situations and those designing in-service testing will select one or more bypass selection tools in order to achieve their goals.

Bash Code Snippet—Separation using IP protocol.

All packets with a TCP field value matching the variable $TWAMP received on the ingress port of br-int and heading towards tap1 or tap2 are diverted towards the bypass bridge instead.

FIG. 21 shows an example of code to provide this type of discernment.

Generation of Layer 2 Connectivity Test Messages.

Ethernet Service OAM CCM messages may be used as the test packets. These packets may be triggered at an Ethernet switch port at the start of the test path.

CLI Code Snippet—Test Packet Generation.

Figure 23:
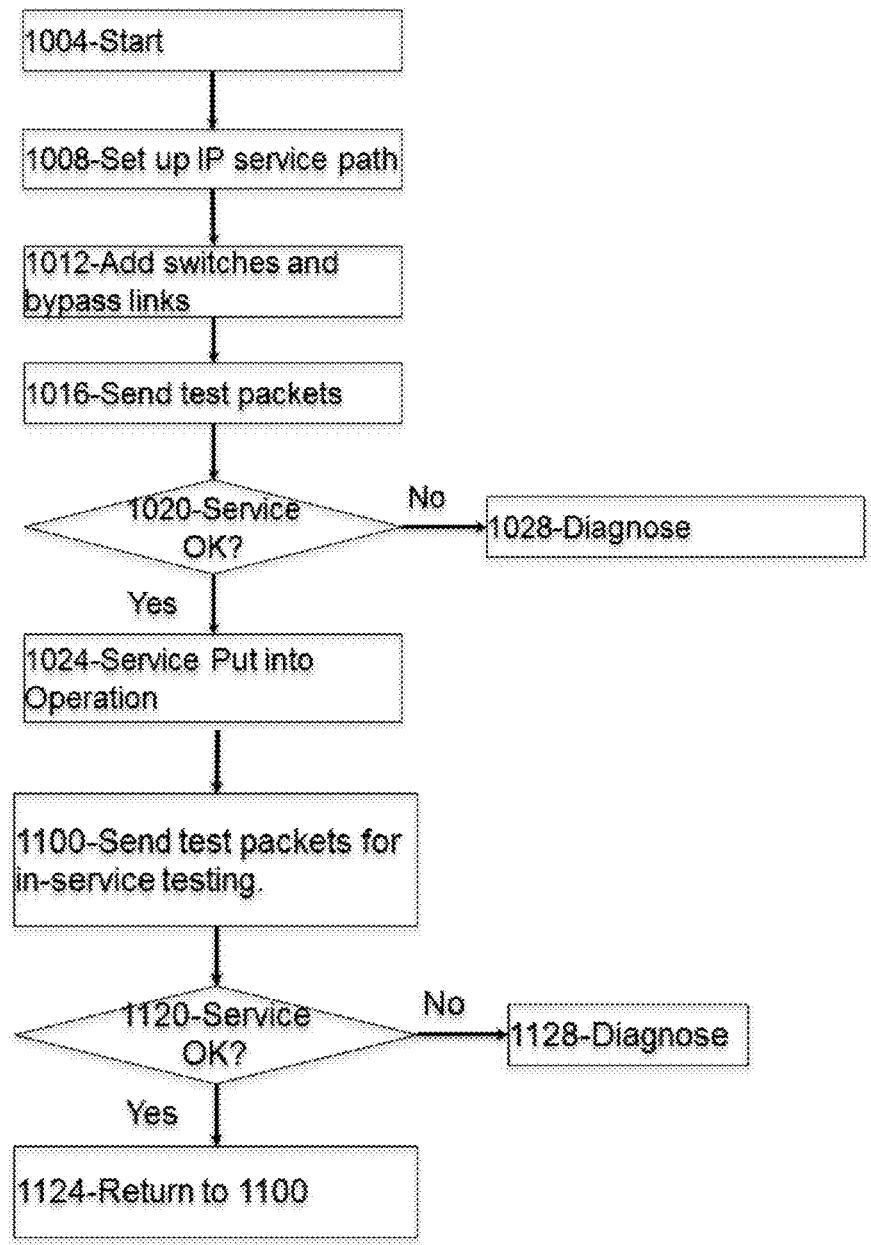
FIG. 23 is a view of a flow chart for verifying an network service path.

Commands used to trigger generation of Layer 2 connectivity test messages (Ethernet Service OAM CCM messages in this case):

FIG. 23 shows a flow chart 1000 for implementing the verification of services.

Step 1004—Start.

Step 1008—the operator sets up a network service path 112.

Step 1012—the operator adds the switches (such as 304, 308, 312, and 316) and bypass mechanisms (such as 330 and 334). This step can be done manually for either physical or virtual components. For virtual components, the switches and bypasses can be generated automatically by analysis of the network service path 112. Note that in some systems, the switches may be added automatically in step 1008 on either side of virtual components so all that needs to be added are the bypasses.

Step 1016—Send test packets 500.

Branch 1020—If the test packets 500 are successfully received then the service is put into operation at step 1024. If the test packets 500 are not successfully received then the service is diagnosed 1028. Diagnosis could be manual or automated. Typically, the testing is done from end to end to verify the entire network service path before any components are put into service.

Step 1100—Send test packets for in-service testing. A person having ordinary skill in the art will recognize that while in-service testing could be done in response to a detected problem, it is likely to be done on a regular recurring basis. The in-service testing is done to a live system without disrupting real customer traffic to continuously verify that path continuity is not broken Branch 1120—If the test packets 500 are successfully received then the there is no need to diagnose and the branch goes to step 1124 to await the next in-service test. If the test packets 500 are not successfully received then the service is diagnosed 1128. Diagnosis could be manual or automated. Diagnosis at step 1128 may be done differently than the diagnosis at step 1028 as the network is in-service.

A graph consisting of network device ports as its vertices, and connections between ports as its edges, is constructed and analyzed to identify all possible end-to-end paths for service verification. This graph is related to the material discussed above as there may be multiple paths between two service end points, and individual IP packets may take any of these paths as determined by routers along the way. So all these paths need to be verified both out-of-service and in-service. In this code snippet, we take a network description, construct a network graph and automatically compute all possible network service paths that need to be verified. Bypasses are then established along these paths.

Java Code Snippet.

A Java code snippet that captures the construction and analysis of network graph and extraction of network service paths to verify is shown in FIG. 24:

ALTERNATIVES AND VARIATIONS

While the examples given above reference SOAM, the disclosure may be extended to a wide variety of test packets including those set forth in:

ITU-T Y.1731 Fault and Performance Monitoring

IEEE 802.1ag Connectivity Fault Management

TWAMP—RFC 5357 Two-Way Active Measurement Protocol

Ping such as an echo request message in Internet Control Message Protocol

Traceroute, a diagnostic tool for displaying the route and transit delays of IP packets.

Those of skill in the art will recognize that while the particulars of various test packets differ, they are passed in an Ethernet frame. Adaption of the teachings of the present disclosure to a wide variety of test packet use may be done by those of skill in the art without deviating from the spirit and scope of the present disclosure.

Additional Network Functions.

While the examples set forth in this disclosure address the use of two network functions, a customer router and a security device, the teachings of the present disclosure can be applied to a set of one or more network functions. Beyond the customer router and security device used in examples, the network functions may include:

Virtual Private Network (VPN);

Intrusion Detection System (IDS);

Intrusion Prevention System (IPS);

IP Multimedia System (IMS);

Session Border Controller (SBC); and

Deep Packet Inspection (DPI).

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

We claim:

1. A method for verification of continuity for a network service path that includes at least one network function that blocks test packets; the method comprising:

set up the network service path through at least one network function that would block test packets;

providing a bypass mechanism to bypass test packets around the at least one network function that would block test packets; and send test packets through a modified network service path that includes the bypass mechanism around the at least one network function that would block test packets wherein:

a first switch is placed on a first side of the at least one network function;

a second switch is placed on an opposite side of the at least one network function;
non-test packets that reach the first switch are passed to the at least one network function and passed by the at least one network function to the second switch; and test packets that reach the first switch are passed through the bypass mechanism around the at least one network function and provided to the second switch; and
if test packets do not reach an opposite end of the modified network service path;
then begin process to diagnose a problem;
else in-service verification of the continuity for the network service path is deemed verified.

2. The method of claim 1 wherein verification is repeated on a recurring basis with the network service path in-service to handle non-test packets.

3. The method of claim 1 wherein the bypass mechanism is implemented as a physical link.

4. The method of claim 1 wherein the bypass mechanism is implemented as a bridge with VLAN translating flow.

5. The method of claim 1 wherein the bypass mechanism is a flow defined inside another bridge.

6. The method of claim 1 wherein the bypass mechanism is a virtual cable.

7. The method of claim 1 wherein the at least one network function that blocks test packets is implemented on a physical device.

8. The method of claim 1 wherein the at least one network function that blocks test packets is implemented on a virtual device.

9. The method of claim 1 wherein the test packets are identified as test packets based upon a Destination MAC address.

10. The method of claim 1 wherein test packets are identified as test packets based upon MAC source address.

11. The method of claim 1 wherein test packets are identified as test packets based upon a layer 2 Ethertype.

12. The method of claim 1 wherein test packets are identified as test packets based upon a VLAN tag.

13. The method of claim 1 wherein a subset of IP packets are deemed to be test packets and are selected to be bypassed around at least one network function.

14. The method of claim 1 wherein packets are deemed to be test packets based upon a value in a TCP field.

15. The method of claim 1 wherein the test packets are Ethernet Service OAM CCM messages.

16. The method of claim 1 wherein the test packets are consistent with standards in ITU-T Y.1731 Fault and Performance Monitoring.

17. The method of claim 1 wherein the test packets are consistent with standards in IEEE 802.1ag Connectivity Fault Management.

18. The method of claim 1 wherein the test packets are consistent with standards for TWAMP—RFC 5357 Two-Way Active Measurement Protocol.

19. The method of claim 1 wherein the test packets are a type of ping such as an echo request message in Internet Control Message Protocol.

20. The method of claim 1 wherein the test packets are generated by a diagnostic tool for displaying route and transit delays of IP packets.

21. The method of claim 1 wherein the bypass mechanism uses a Layer 2 switch.

22. The method of claim 1 wherein the bypass mechanism uses a Layer 3 switch.

23. The method of claim 1 wherein the first switch and the second switch are implemented within a single VLAN-aware bridge.

* * * * *